United States Patent
Bostick et al.

(10) Patent No.: US 10,241,747 B2
(45) Date of Patent: Mar. 26, 2019

(54) NOISE CONTROL SERVICE FOR ACTIVITIES

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1 day.

(21) Appl. No.: 15/638,525

(22) Filed: Jun. 30, 2017

(65) Prior Publication Data
US 2019/0005937 A1    Jan. 3, 2019

(51) Int. Cl.
G06F 3/16 (2006.01)
H04M 1/725 (2006.01)
H04W 4/30 (2018.01)
G10K 11/16 (2006.01)

(52) U.S. Cl.
CPC ........ G06F 3/165 (2013.01); H04M 1/72569 (2013.01); H04M 1/72577 (2013.01); H04W 4/30 (2018.02); G10K 11/16 (2013.01); *G10K 2210/12* (2013.01)

(58) Field of Classification Search
CPC ......... H04M 1/72563; H04M 1/72566; H04M 1/72569; H04M 1/72572; H04M 1/72577; H04M 2250/12; H04M 2250/52; H04L 67/22; H04L 12/2816; H04L 12/2818; H04L 12/2827; G10K 11/16; G06F 3/165; H04W 4/02; H04W 4/023; H04W 4/021; H04W 4/027; H04W 4/029; H04W 4/025; H04W 4/30
See application file for complete search history.

(56) References Cited

U.S. PATENT DOCUMENTS

| 9,035,997 B2 | 5/2015 | Periyannan et al. |
| 9,847,096 B2* | 12/2017 | Konjeti .............. H04M 1/6058 |
| 2005/0108642 A1 | 5/2005 | Sinclair, II |
| 2015/0011195 A1 | 1/2015 | Li |

(Continued)

OTHER PUBLICATIONS

"Automatic Volume Control" [retrieved from the Internet on Jan. 19, 2017]. Retrieved from Internet URL: <http://www.starmarktechnologies.com/Automatic-Volume-Control/index.html>, 2 pgs.

(Continued)

*Primary Examiner* — Magdi Elhag
(74) *Attorney, Agent, or Firm* — Christopher McLane; Hye Jin Lucy Song; Heslin Rothenberg Farley & Mesiti PC

(57) ABSTRACT

Methods, computer program products, and systems are presented. The methods include, for instance: obtaining data relevant to an activity from one or more device in an environment. For the activity presently ongoing, a context of the activity is analyzed and one or more noise control handle for the activity is generated based on the context of the activity. One or more operation specified in the one or more noise control handle is performed to prevent a noise louder than a noise tolerance level for the activity in a boundary of the activity.

25 Claims, 6 Drawing Sheets

(56) References Cited

U.S. PATENT DOCUMENTS

| | | | | |
|---|---|---|---|---|
| 2015/0200787 A1* | 7/2015 | Slupik | ............... | G05B 15/02 |
| | | | | 700/275 |
| 2016/0036962 A1 | 2/2016 | Rand | | |
| 2016/0165420 A1 | 6/2016 | Jeong | | |
| 2016/0195864 A1 | 7/2016 | Kim | | |
| 2017/0041454 A1* | 2/2017 | Nicholls | ............ | H04L 67/16 |
| 2017/0277506 A1* | 9/2017 | VanBlon | ............ | H04W 4/80 |

OTHER PUBLICATIONS

Campbell, Mikey, "Apple patent automatically adjusts iPhone speaker volume based on proximity" [retrieved from the Internet on Jan. 19, 2017]. Retrieved from Internet URL: <http://appleinsider.com/articles/13/05/28/apple-patent-automatically-adjusts-iphone-speaker-volume-based-on-proximity>, May 28, 2013, 2 pgs.

Mell, Peter, et al., "The NIST Definition of Cloud Computing", NIST Special Publication 800-145, Sep. 2011, Gaithersburg, MD, 7 pgs.

* cited by examiner

US 10,241,747 B2

NOISE CONTROL SERVICE FOR ACTIVITIES

TECHNICAL FIELD

The present disclosure relates to Internet of Things (IoT) technology, and more particularly to methods, computer program products, and systems for providing noise control service for certain activities in an environment based on streaming data from multiple IoT devices.

BACKGROUND

Conventional sound adjustment mechanism mostly focuses on enhancing sound delivery to users by noise reduction, volume control amongst tightly coupled components, etc. Other types of conventional sound adjustment technology are related to limiting volume of mobile devices in vehicular environment to improve safety.

SUMMARY

The shortcomings of the prior art are overcome, and additional advantages are provided, through the provision, in one aspect, of a method. The method for providing a noise control service for one or more activity in an environment includes, for example: obtaining, by one or more processor, data relevant to an activity from one or more device in the environment; determining, by the one or more processor, that the activity is presently in progress; analyzing, by the one or more processor, a context of the activity; generating, by the one or more processor, one or more noise control handle for the activity based on the context of the activity; and performing, by the one or more processor, one or more operation specified in the one or more noise control handle such that a noise louder than a noise tolerance level associated with the activity would be prevented in a boundary of the activity.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
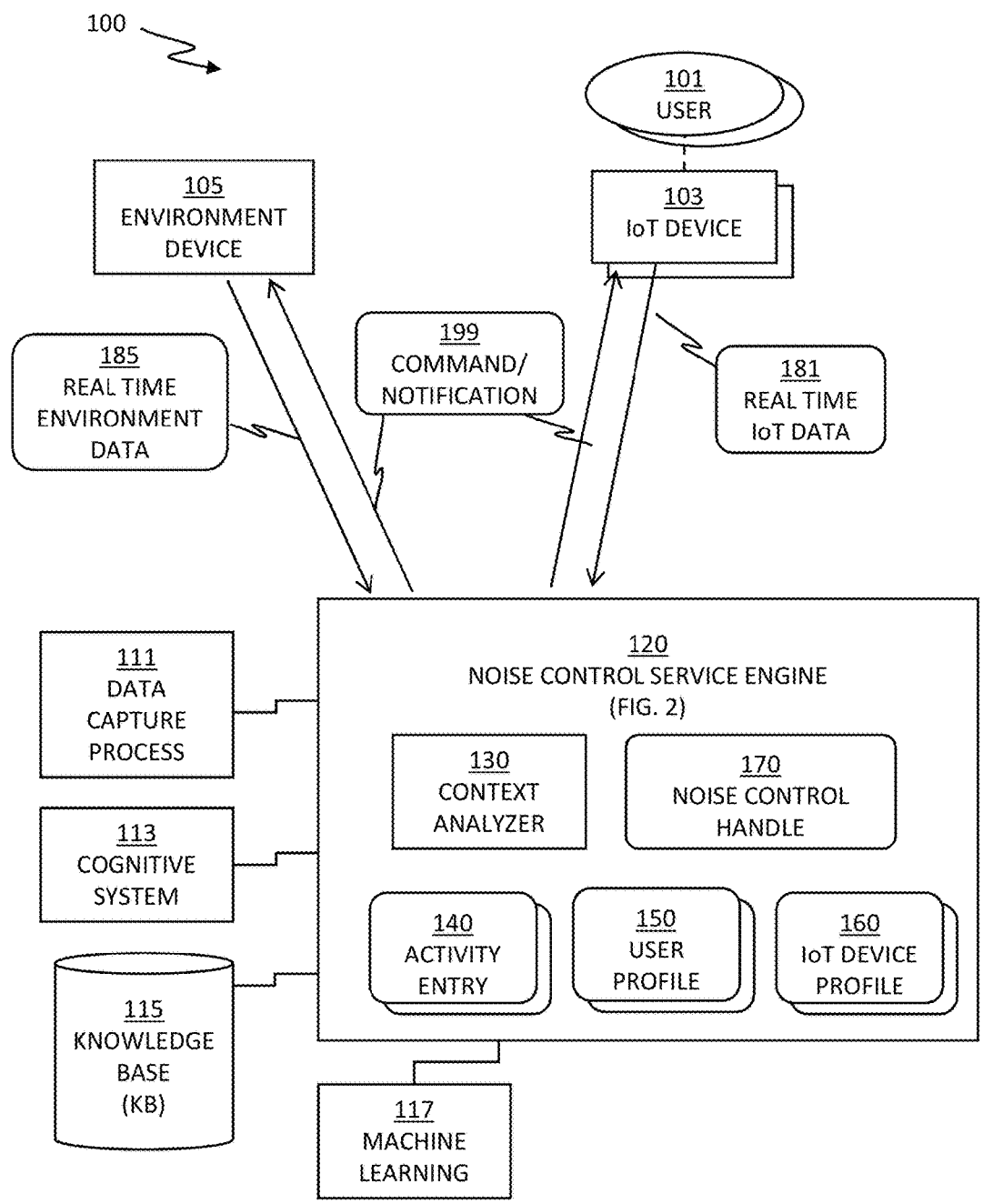
FIG. 1 depicts a system for providing noise control services for activities in an environment, in accordance with one or more embodiments set forth herein.

FIG. 1 depicts a system 100 for providing noise control services for activities in an environment, in accordance with one or more embodiments set forth herein.

The system 100 includes one or more Internet of Things (IoT) device in the environment, an environment device 105 from one or more environment device, and a noise control service engine 120, operationally coupled for communicating with one another via various types of network. The environment is a physical venue in which the noise control service is provided. The noise control service prevents noises disturbing certain kinds of activities that are conducted by privileged users. The noises that originate from the one or more IoT devices, from a person who carries the one or more IoT devices, and/or from the one or more environment device are subject to the noise control service as provided by certain embodiments of the present invention.

The one or more IoT device indicated various types of electronic devices that are communicable via the Internet and other networks. Examples of the IoT device may be, but are not limited to, smartphones, laptops, tablets, smart TVs, speaker phones, home theater sound systems, gaming devices, media players, etc.

A certain IoT device 103 of the one or more IoT device corresponds to a user 101, as being a mobile device and carried by the user 101. The IoT device 103 has components for passive listening such as a microphone and for geographical locating such as global positioning system (GPS) tracking unit, as in a typical smartphone or any other mobile smart devices. The IoT device 103 collects various types of data in real time by use of various components and sends real time IoT data 181 as collected to the noise control service engine 120 by streaming, which refers to a steady and continuous transmission.

The environment device 105 is another type of IoT device installed and placed in the environment that generates input data for and/or receives directive data from the noise control service engine 120. The environment device 105 that generates real-time data on activities with respect to the noise control service may be a security camera, an area microphone system, etc. The environment device 105 collects data in real time and sends real time environment data 185 as collected to the noise control service engine 120 by streaming, similarly to the IoT device 103. The environment device 105 that receives the data from the noise control service engine 120 dictating a certain noise control operation may be a desk phone with network connection and communication capability, a smart home theater system with audio speakers, etc.

The noise control service engine 120 includes a context analyzer 130, an activity entry 140 of one or more activity entry, a user profile 150 of one or more user profile, and an IoT device profile 160 of one or more IoT device profile. The noise control service engine 120 utilizes additional components including a data capture process 111, a cognitive system 113, a knowledge base (KB) 115, and a machine learning component 117.

The data capture process 111 obtains the incoming data 181, 185, selectively processes data relevant to the noise control service, and provides the processed data to the context analyzer 130. The activity entry 140 is generated based on scheduled events as being set by the user 101 on the IoT device 103. The activity entry 140 may include a noise tolerance level associated with the activity, which indicates a threshold level of a noise that may become disruptive to the activity. The user profile 150 specifies whether or not the user 101 is privileged for the purpose of the noise control service, previous preference of the user 101 on boundaries for certain activities that uses the noise control service, etc. The IoT device profile 150 is generated when the IoT device 103 is registered for the noise control service. The IoT device profile 150 may include, but not limited to, the identity information of the user 101 who is associated with the IoT device 103, an identification of the IoT device 103, notification modes supported by the IoT device 103, etc.

The context analyzer 130 utilizes functionalities of the cognitive system 113 in analyzing activity related data sent by the data capture process 111 including speech data, sound pressure levels of captured audio data, geolocation data, and textual data of respective IoT devices, as well as information available from the KB 115, the activity entry 140, the user profile 150, and the IoT device profile 160.

The knowledge base (KB) 115 includes comprehensive data useful for the noise control service, including but not limited to, sound pressure levels of common audio sources, various noise tolerance levels corresponding to certain activities, additional factors in determining boundaries of activities for the purpose of the noise control service such as topic being discussed, confidentiality, identities of the participants, etc. The KB 115 is configured prior to commence the noise control service and would be automatically updated by use of case data accumulated while providing the noise control service for activities by use of the machine learning component 117.

The context analyzer 130 as assisted by the cognitive system 113 generates a noise control handle 170 as a result of analyzing the context of the activity and noises. The noise control handle 170 may be one of a direct control, a proactive notification, and a reactive notification. The noise control service engine 120 subsequently sends a command/notification 199 corresponding to the noise control handle 170, to the IoT device 103 and/or to the environment device 105 subject to the noise control service.

For example, if the noise control service is available in a home environment, a privileged user, often a parent or the parents, may mute or turn off a sound system in a living room adjacent to an office for a certain time period, may send a text message to stop children from playing game with speakers on, or silence phones and TVs in the home that are within the auditory range from a sleeping baby. Details of a noise control service example for an office environment as provided by the noise control service engine 120 are presented in FIG. 3 and corresponding description.

Figure 2:
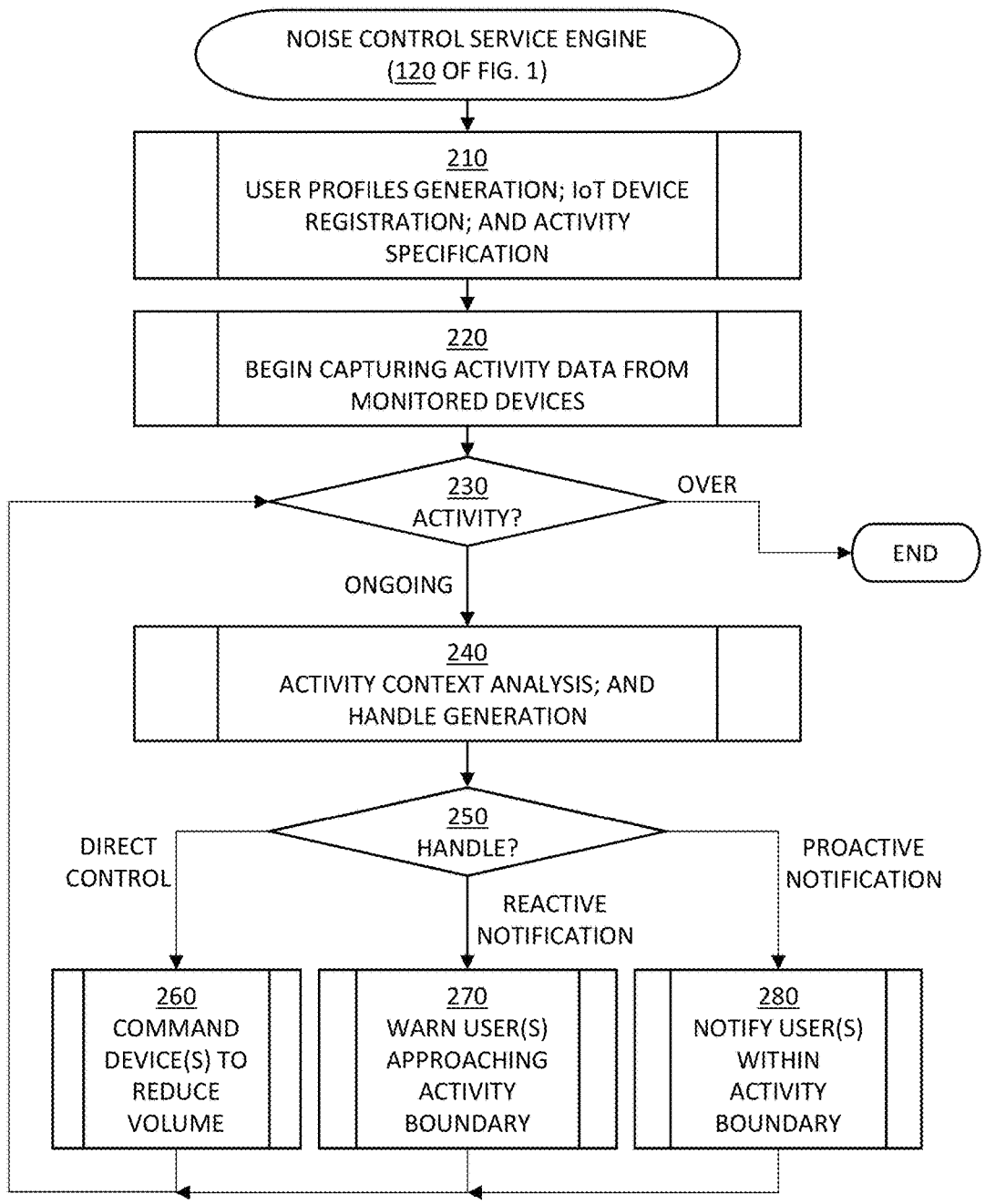
FIG. 2 depicts a flowchart performed by the noise control service engine of the system, in accordance with one or more embodiments set forth herein.

FIG. 2 depicts a flowchart performed by the noise control service engine 120 of FIG. 1, in accordance with one or more embodiments set forth herein.

In block 210, the noise control service engine 120 performs a comprehensive preparation for the noise control service by generating user profiles, by registering IoT devices, and by specifying various parameters of activities. In the user profiles, the noise control service engine 120 specifies whether or not respective users have a privilege as to the volume level of sound generated by activities of the users. The noise control service engine 120 also specifies whether or not a certain user has a special requirement as to the volume level acceptable, in the user profile. Activities of the privileged users may have a priority over activities of non-privileged users, wherein two activities may disturb each other with the respective sound generated by the activities. In the IoT device registrations, the IoT devices associated with privileged users may inherit the privileges of the users. Activities are specified with respective parameters including a noise tolerance level indicating a level of noise that is acceptable for the respective activities. The noise tolerance level may be configured with inputs from the users, or learned from the knowledgebase including various volume levels of numerous activities, etc., that are readily available. Examples of the activities may include, but are not limited to, teleconference, business meeting, watching movie, etc. The noise tolerance level may be adjusted for each instance of the activity based on whether or not a user participating in or otherwise performing the activity is privileged, a level of sensitivity to sound/noise of a user, whether or not a user who may be loud enough to impact the activity is privileged, etc. Then the noise control service engine 120 proceeds with block 220.

In block 220, the noise control service engine 120 begins capturing activity data from monitored devices. Various Internet of Things (IoT) devices corresponding to respective users as well as environment devices such as security camera may be monitored for activity data. As the monitored devices continuously generates activity data, the captured activity data is a stream corresponding to each device. The noise control service engine 120 continuously captures the activity data streams in blocks 220 through 280. Examples of the activity data streams may include, but are not limited to, geographical coordinates of the IoT devices in an environment subject to the noise control service, audio data stream acquired from passive listening by use of microphones of IoT devices of the serviced environment, video data stream acquired from various types of fixed and/or mobile cameras within the serviced environment, text data available from the IoT devices within the serviced environment, etc. The types of cameras generating the video data stream may be locational security camera as well as camera from all types of mobile devices such as smartphones, laptops, tablets, smart TVs, etc. Examples of the text data may include, but are not limited to, emails, instant messages, social media contents, and calendar events for meetings including information on date, time, description, participants, and whether or not the meeting will be held in person or by telecommunication. The noise control service engine 120 analyzes the captured real time activity data stream by use of a cognitive system. Then the noise control service engine 120 proceeds with block 230.

In block 230, the noise control service engine 120 determines whether or not an activity subject to the noise control service is in progress. The activity may be preconfigured with a time schedule and other details based on a calendar event of a user on the IoT device of the user, based on text data from block 220. The activity also may be detected in real time based on audio/video data stream from monitored devices. In certain embodiments of the present invention, the noise control service engine 120 determines that the activity is subject to the noise control service by ascertaining that the activity is associated with a privileged user, by scheduling the activity, by participating in the activity as shown from the data from block 220, etc. If the noise control service engine 120 determines that an activity subject to the noise control service is presently going on, then the noise control service engine 120 proceeds with block 240. If the noise control service engine 120 determines that the activity that has been previously in progress is now ended, then the noise control service engine 120 terminates servicing the activity.

In certain embodiments of the present invention, the noise control service engine 120 may loop back to block 220 in order to provide the noise control service for another activity, if one activity is over. In certain embodiments of the present invention, the noise control service engine 120 may run only during a preconfigured service hour in the environment. For example, the noise control service may be useful during business hours in an office environment, during evening hours in a home with many family members, etc.

In block 240, the noise control service engine 120 analyzes the context of the activity by use of various data gathered from respective IoT devices and/or environment devices. Examples of the context of the activity may include, but are not limited to, a geographical boundary within which the noise control service is provided for the activity, content of speech in the activity, identity of participants, privilege check of the participants, a noise tolerance level applicable for the activity and the identified participants, etc. According to the context as analyzed, the noise control service engine 120 generates one or more handle to control the noise within the geographical boundary, or simply a boundary, of the activity in order to prevent any sound louder than the noise tolerance level of the activity. Details of the noise control handle are presented in blocks 260, 270, and 280 below. Then the noise control service engine 120 proceeds with block 250.

In determining the geographical boundary of the noise control service for the activity, the noise control service engine 120 takes the agenda/topic being discussed by the activity, the number of participants and the atmosphere of the activity, seriousness/confidentiality of the topic that would be dealt with the activity, established audible distances of common sound sources, as well as aggregate measurements of sound levels at each IoT devices with the geographical coordinates of the IoT devices, into account. For example, wherein a project meeting is conducted with a project leader on a major step of the project, the noise control service engine 120 may set a larger boundary than other meetings on a less serious topic and/or amongst a few of the team members without the project leader. The noise control service engine 120 may facilitate the user to set the boundary with a user input, where appropriate.

The audio data may be analyzed for content of speech by use of natural language processing components that are readily available. The noise control service engine 120 may utilize the result of content analysis in determining whether or not the activity is subject to the noise control service. For example, in the office environment, only business-related discussions may utilize the noise control service, and if the noise control service engine 120 determines that a present conversation is not business-related, then the noise control service engine 120 may treat the present conversation as a noise to another serviced activity.

The environment device input such as video camera feed may be utilized to add details to the activity such as a number and identities of participants, body languages of the participants, etc. In order to determine the identities of the participants, the noise control service engine 120 may further utilize facial recognition functionalities in processing the video camera feed. The noise control service engine 120 may use login information the user input to certain IoT devices for authentication in identifying the user. The noise control service engine 120 may also use user profiles and IoT device profiles in order to identify the users by use of the respective presence of the IoT devices corresponding to the respective users.

The noise control service engine 120 examines whether or not any one of the participants to the activity is privileged or otherwise has priority to use the noise control service in exercising control over noises external to the activity. For example, in an office environment, a manager may be a privileged user, and when the manager is engaged in a business discussion in the office environment, then the business discussion may be serviced by the noise control service. For another example, if a home environment, parents may be privileged users, and when one of the parents is watching TV in the family room, the children, who are not privileged, may be subject to noise control commands and/or notifications as a result of the noise control service for the activities of the parents. In the same example, the children playing a video game nearby may not invoke the noise control service over the TV watching of the parents, even if the TV sound impacts the game, as the children are not privileged.

The noise control service engine 120 determines the noise tolerance level of the activity for the participants as identified according to the knowledgebase, activity parameters, etc. Various sound pressure levels for common activities are well known such as a normal speech in a range of 50 to 70 decibel (dBA), a quiet talking in a range of 10 to 20 decibel, etc.

In block 250, the noise control service engine 120 determines what kind of handle has been generated in block 240. If the noise control service engine 120 had generated a direct control handle, then the noise control service engine 120 proceeds with block 260. If the noise control service engine 120 had generated a reactive notification handle, then the noise control service engine 120 proceeds with block 270. If the noise control service engine 120 had generated a proactive notification handle, then the noise control service engine 120 proceeds with block 280.

In certain embodiments of the present invention, the noise control service engine 120 generates a direct control handle, a proactive notification handle, and a reactive notification handle in block 240, and then the noise control service engine 120 determines which handle should be applied to a specific IoT device/user in block 250. If the noise control service engine 120 determines that the direct control handle should be applied to a certain IoT device associated with a user and/or an environment device, then the noise control service engine 120 proceeds with block 260. If the noise control service engine 120 determines that the reactive notification handle should be applied to another certain IoT device associated with another user, then the noise control service engine 120 proceeds with block 270. If the noise control service engine 120 determines that the proactive notification handle should be applied to a third certain IoT device associated with still a third user, then the noise control service engine 120 proceeds with block 280.

In block 260, the noise control service engine 120 sends commands to respective IoT devices to change volume in order to reduce noise from the respective IoT devices for the ongoing activity, according to the direct control handle. Then the noise control service engine 120 loops back to block 220 to update the real time data stream regarding the activity.

The noise control service engine 120 performs block 270 according to the direct control handle generated in block 240. The direct control handle is generated responsive to ascertaining that a privileged user is performing the activity in the environment wherein the noise control service is provided, and that the noise that may impact the activity originates from the IoT devices/the environment device, which may be manipulated directly from the noise control service engine 120.

The direct control handle includes the noise tolerance level of the activity within the environment as requested from the IoT devices/the environment device, the duration of the activity, the boundary for activities etc. Responsive to receiving the direct control handle from the noise control service engine 120, the IoT device performs operations respectively specified in the received direct control handle such that the IoT device as well as the user associated with the IoT device may not produce a sound louder than the noise tolerance level that may disturb the activity of the privileged user. Similarly, upon receiving the direct control handle, the environment device performs respective operations dictated in the proactive notification handle according to predetermined configurations for the noise control service.

For example, if one of the parents is conducting a business conference telephonically in a home office, then the noise control service engine 120 reduces the volume of all IoT devices within an auditory range from the home office to a level that does not exceed 20 decibel, which is equivalent to a quiet talk, by sending a direct control handle commanding to reduce a ring volume of nearby smartphones in the home, registered for the noise control service in the home environment, to 20 decibel on smartphones, etc.

In block 270, the noise control service engine 120 sends reactive notifications to users of respective IoT devices who are approaching the auditory range of the activity in order to inform the approaching users of the activity. The noise control service engine 120 may automatically configure the auditory range of the activity based on average human hearing capacity, special requirements of the user as stored in the user profiles, and the various sound measurements from various distances in the environment. The noise control service engine 120 also facilitates each privileged user to define respective boundaries corresponding to activities. Then the noise control service engine 120 loops back to block 220 to update the real time data stream regarding the activity.

The noise control service engine 120 performs block 270 according to the reactive notification handle generated in block 240. The reactive notification handle is generated responsive to ascertaining that a privileged user is performing the activity in the environment wherein the noise control service is provided, that the noise which may impact the activity originates from users, and that the users/IoT devices approach the boundary of the activity.

The reactive notifications informs the approaching users and requests not to disturb the activity. Accordingly, the reactive notification may include various information as to the activity such as a title/summary of the activity, participant of the activity, a prospective duration of the activity according to scheduled event data when available and/or an indication that the activity is presently progressing, a map of the environment showing the boundary of the activity, a noise tolerance level of the activity, etc. Wherein an individual noise tolerance level is not specified for each activity, silence to a quiet talk under 10 decibel are treated as acceptable for all activities by default. Upon receiving the reactive notification handle, the IoT devices perform respective operations dictated in the reactive notification handle according to predetermined configurations for the noise control service.

In block 280, the noise control service engine 120 sends proactive notifications to users of respective IoT devices who are present within the auditory range of the activity in order to inform the users of the activity. The noise control service engine 120 may automatically configure the auditory range of the activity based on average human hearing capacity, special requirements of the user as stored in the user profiles, and the various sound measurements from various distances in the environment, as in reactive notifications. The noise control service engine 120 also facilitates each privileged user to define respective boundaries corresponding to activities.

The noise control service engine 120 performs block 280 according to the proactive notification handle generated in block 240. The proactive notification handle is generated responsive to ascertaining that a privileged user is performing the activity in the environment wherein the noise control service is provided, and that the noise which may impact the activity originates from users in the boundary of the activity.

The proactive notifications informs the users present within the boundary of the activity and requests not to disturb the activity. Accordingly, the proactive notifications may include various information as to the activity such as a title/summary of the activity, participant of the activity, a prospective duration of the activity according to scheduled event data when available and/or an indication that the activity is presently progressing, a map of the environment showing the boundary of the activity, a noise tolerance level of the activity, etc. Wherein an individual noise tolerance level is not specified for each activity, silence to a quiet talk under 10 decibel are treated as acceptable for all activities by default. Upon receiving the proactive notification handle, the IoT devices perform respective operations dictated in the proactive notification handle according to predetermined configurations for the noise control service.

The noise control service engine 120 also facilitates the user who scheduling a meeting to specify the notification mechanism such that the proactive notification may not become a disturbance to the activity. For example, the noise control service engine 120 may automatically change respective notification modes of all IoT devices within the boundary of the activity to a silent mode and/or a vibration mode. The noise control service engine 120 monitors the notified IoT devices by use of passive listening while the activity continues. The noise control service engine 120 may send a haptic feedback to lower the voice or otherwise to become quite if a user within the boundary makes sound louder than the noise tolerance level for the activity.

Wherein a user-defined boundary, a notification mode, and/or the noise tolerance level for specific activities are provided as inputs, the noise control service engine 120 stores the inputs as configuration preferred by the users for the same activities in the knowledgebase, which may be utilized later in automated determination of the same parameters for the users or similarly situated other users. In certain embodiments of the present invention, the noise control service engine 120 may cumulate the user preferred configurations on noise control services by use of machine learning.

Figure 3:
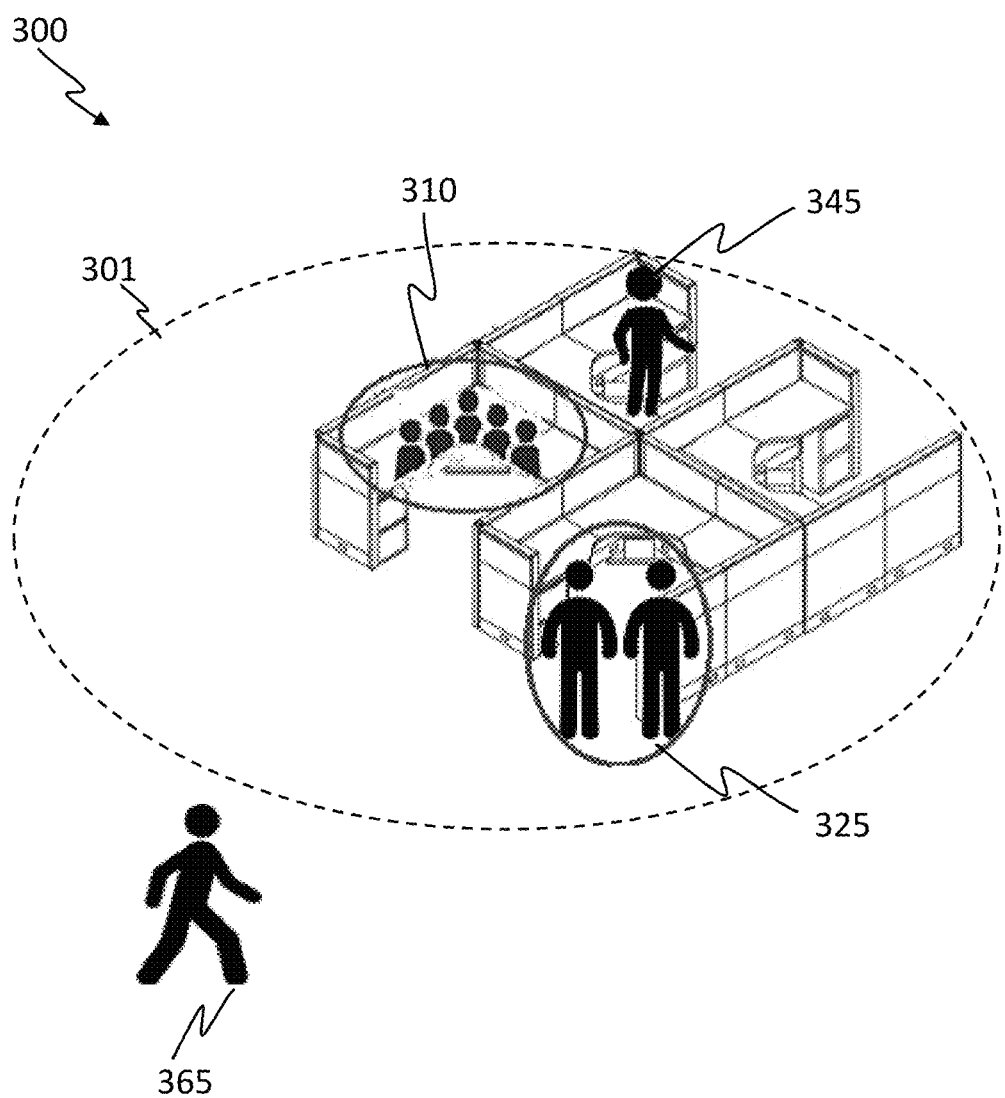
FIG. 3 depicts an exemplary noise control service as performed by the noise control service engine, in accordance with one or more embodiments set forth herein.

FIG. 3 depicts an exemplary noise control service as performed by the noise control service engine 120 according to operations of FIG. 2, in accordance with one or more embodiments set forth herein.

An office environment 300 is subject to the noise control service as provided by the noise control service engine 120 of FIG. 1. All users in the office environment 300 carry respective IoT devices such as smartphones. The IoT devices within the office environment 300 are registered for the noise control service, associated with respective users, and have permission to send notifications and to collect data necessary for the noise control service.

A user in a first group 310 schedules a conference call with four (4) other participants. Accordingly, the noise control service engine 120 determines a geographical boundary 301 for the conference call in order to provide the noise control service. All IoT devices within the geographical boundary 301 including respective IoT devices carried by the users in the first group 310, users in a second group 325, and User J 345, receive a direct control command to switch to silent/vibrating mode for all notifications at the beginning of the conference call. Accordingly, any phone call received during the conference call, the IoT devices within the geographical boundary 301 would notify the reception in silent/vibrating mode.

If the users in the second group 325 talk louder than the noise tolerance level set for the conference call, then the noise control service engine 120 detects the disturbance by passively listening on the respective IoT devices of the users in the second group 325 and by comparing the measured volume with the noise tolerance level for the conference call. After ascertaining that the conversation of the second group 325 is louder than the noise tolerance level of the conference call, the noise control service engine 120 generates a proactive notification handle to prevent the users of the second group 325 from continuing the loud conversation. Accordingly, the noise control service engine 120 generates and sends a notification including the summary of the conference call, a prospective end time, a request to stay quiet for the conference call, etc., to respective IoT devices of the users of the second group 325. The notification may be sent in a text or an instant message, in combination with a vibration, a screen flash/display, or any other sensory stimulation other than sound.

During the conference all, the noise control service engine 120 detects that User K 365 is approaching the geographical boundary 301 by passive listening on the IoT device of User K 365. Accordingly, the noise control service engine 120 generates and sends a notification including the summary of the conference call, a prospective end time, a request to stay quiet for the conference call, etc., to the IoT device of User K 365.

Certain embodiments of the present invention may offer various technical computing advantages, including contextual analysis on streaming data from IoT devices in a serviced environment in order to control noises for an activity by use of cognitive computing and machine learning. A boundary of the activity within which a noise control service is performed may be determined based on general data such as audible distances and common sound sources, sound levels measured on IoT devices, as well as specific details of the activity including topic, participants, etc. The activity is associated with a noise tolerance level and the noise control service engine takes measures to prevent any sound above the noise tolerance level for the duration of the activity. Certain embodiments of the present invention may directly control sound volume of the IoT devices within the boundary of the activity. Certain embodiments of the present invention may proactively notify users of the IoT devices within the boundary of the activity with visual/tactile notifications. Certain embodiments of the present invention may reactively notify users of the IoT devices approaching the boundary of the activity with similar visual/tactile notifications. Characteristics of activities and corresponding boundary settings are automatically cumulated such that the noise control service may be provided in a more effective and intelligent manner. By use of multithreading and/or multi-processing, the noise control services may be concurrently rendered for any number of activities in the serviced environment. Certain embodiments of the present invention may be implemented by use of a cloud platform/data center, and the noise control services may be provided as a subscribed service for any type of client with physical locations. Certain embodiments of the present invention improves productivity and effectiveness of activities conducted in the physical locations by preventing auditory disturbances to the activities that may be caused by inadvertent usage of IoT devices and behaviors.

Figure 4:
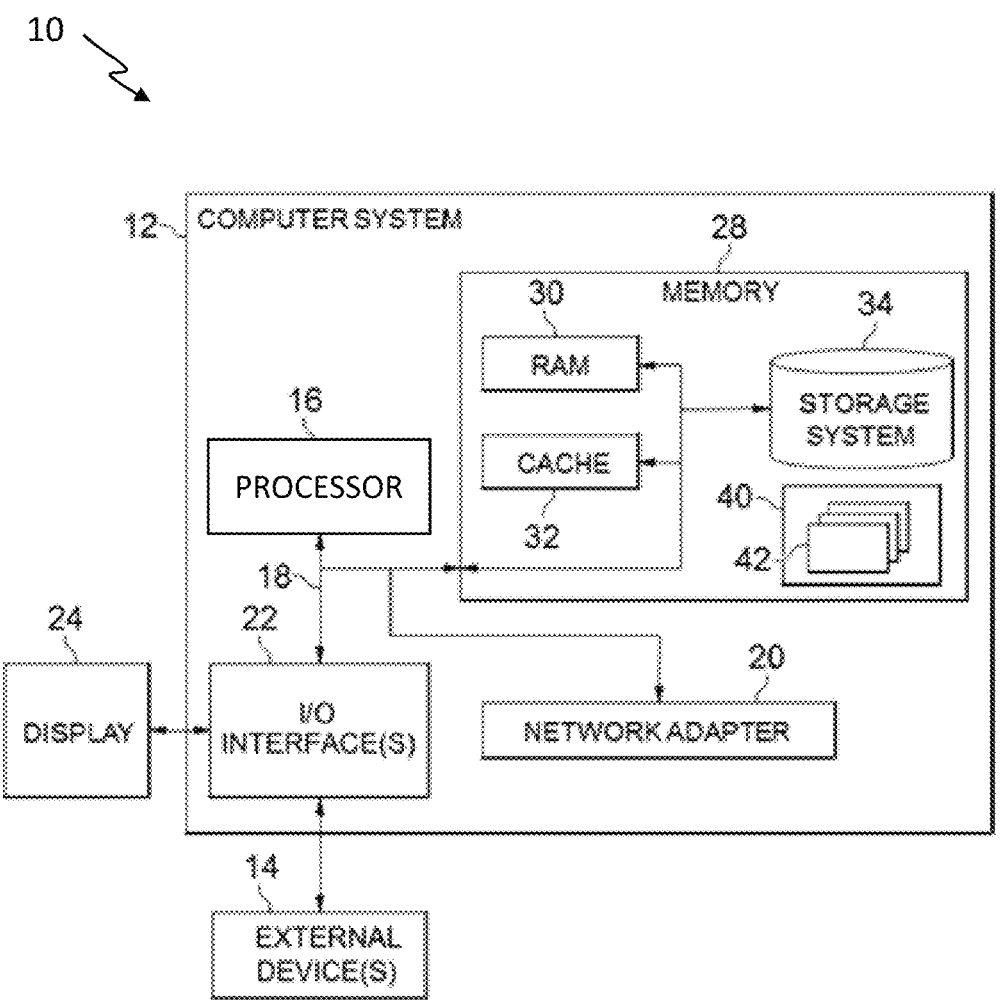
FIG. 4 depicts a cloud computing node according to an embodiment of the present invention.
Figure 5:
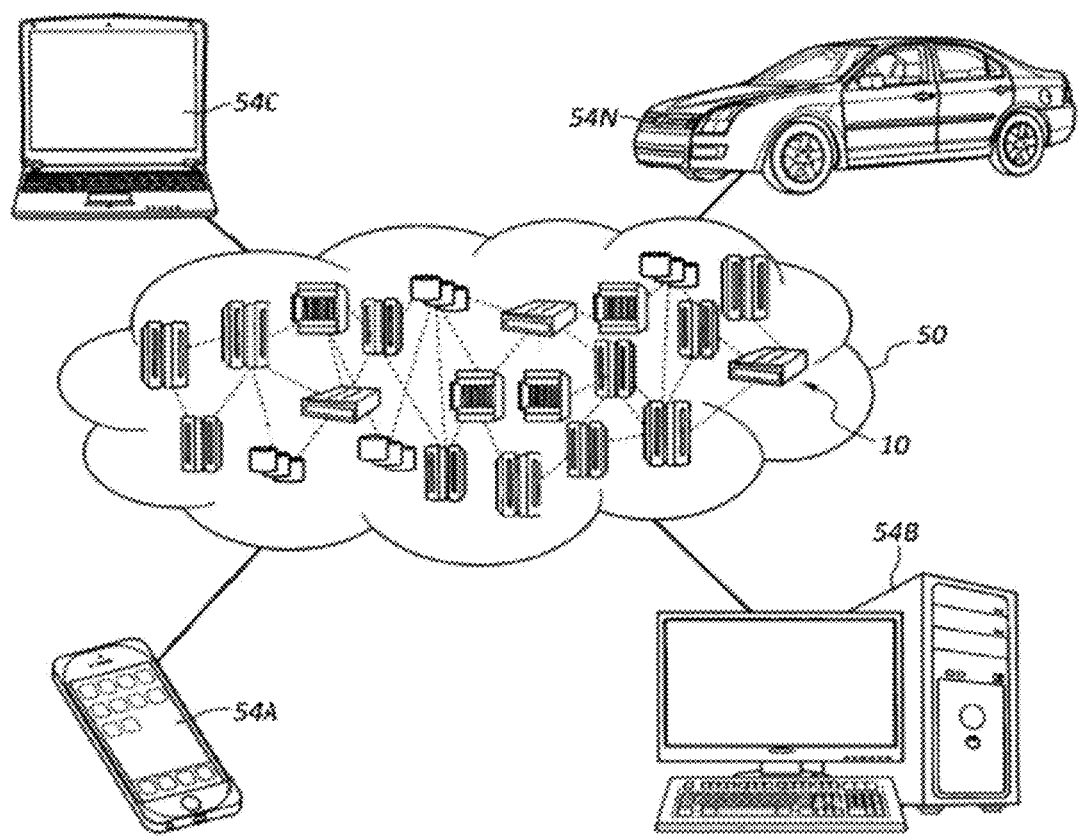
FIG. 5 depicts a cloud computing environment according to an embodiment of the present invention.
Figure 6:
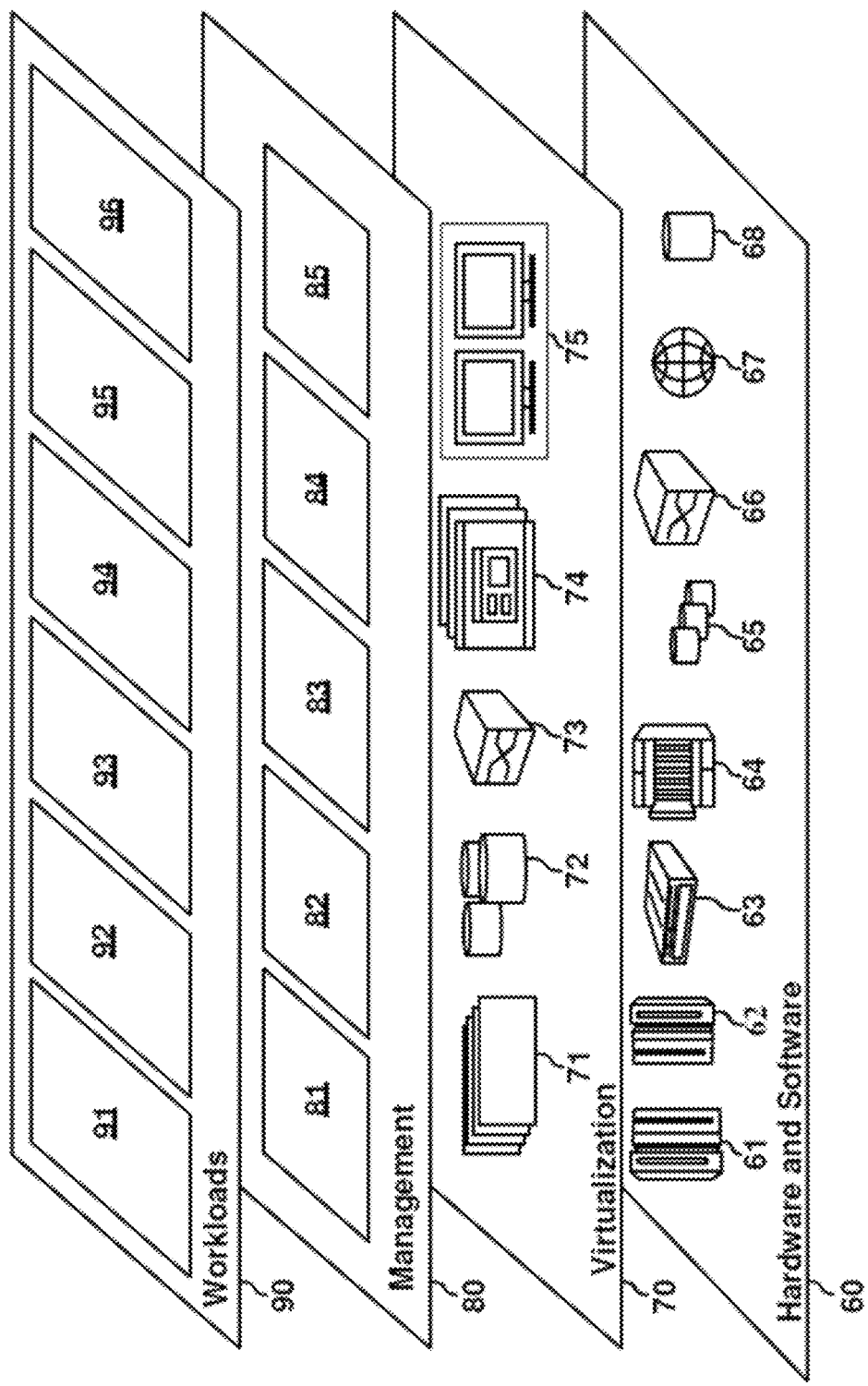
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the noise control service engine 120 of FIG. 1. Program processes 42, as in the noise control service engine 120 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the noise control service engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing a noise control service for one or more activity in an environment, comprising:

obtaining, by one or more processor, data relevant to an activity of one or more user, from one or more device in the environment;

determining, by the one or more processor, that the activity is presently in progress;

analyzing, by the one or more processor, a context of the activity;

generating, by the one or more processor, one or more noise control handle for the activity based on the context of the activity; and performing, by the one or more processor, one or more operation specified in the one or more noise control handle such that a noise louder than a noise tolerance level associated with the activity would be prevented in a boundary of the activity.

2. The computer implemented method of claim 1, wherein the one or more device in the environment is selected from an Internet of Things (IoT) device that is portable and carried by a user, an environment device that is another IoT device located in the environment, and combinations thereof, wherein the one or more device within the environment is registered for identification and access.

3. The computer implemented method of claim 1, wherein the one or more user conducting the activity is privileged for the noise control service such that the one or more user is not disturbed by any noise louder than the noise tolerance level of the activity while participating in the activity.

4. The computer implemented method of claim 1, the analyzing comprising:

ascertaining respective values applicable for the boundary of the activity, the noise tolerance level of the activity, user privileges for participants of the activity, content of speech in the activity, and respective identities of the participants, by use of the data from the obtaining.

5. The computer implemented method of claim 1, wherein the one or more noise control handle is selected from a direct control handle, a reactive notification handle, a proactive notification handle, and combinations thereof, wherein the direct control handle commands the one or more device to lower volume to below the noise tolerance level of the activity, wherein the reactive notification handle warns a first user approaching the boundary of the activity not to generate any sound louder than the noise tolerance level of the activity, and wherein the proactive notification handle notifies any user within the boundary of the activity not to generate any sound louder than the noise tolerance level of the activity.

6. The computer implemented method of claim 1, the generating further comprising:

adjusting the boundary of the activity based on data useful for the noise control service stored in a knowledgebase, wherein the data stored in the knowledgebase include sound pressure levels of common audio sources, various noise tolerance levels corresponding to past activities, and additional factors specific for the activity including a topic being discussed in the activity, confidentiality of the activity, confidentiality of the topic, identities of the participants, and combinations thereof.

7. The computer implemented method of claim 6, wherein one or more user scheduling the activity input values for parameters on the context of the activity, and wherein the values are stored in the knowledgebase by machine learning.

8. The computer implemented method of claim 1, the generating comprising:

creating, by a noise control engine of the environment, a direct control handle as one of the one or more noise control handle, wherein the direct control handle includes a direct control command to switch to a silent or vibrating mode for all notifications to a first group in the one or more device located within the boundary of the activity at a beginning of the activity, wherein the environment is an office environment, wherein the activity is a conference call with two or more participants; and wherein the first group in the one or more device within the boundary of the activity includes respective devices of the two or more participants; and sending the direct control handle respectively to the first group in the one or more device to facilitate respective performances of the direct control handle on the respective devices.

9. The computer implemented method of claim 1, the generating comprising:

creating, by a noise control engine of the environment, a reactive notification handle, as one of the one or more noise control handle, wherein the reactive notification handle includes a text message, the text message informing that the activity is in progress and warning not to make any sound louder than the noise tolerance level of the activity, wherein the environment is an office environment, and wherein the activity is a conference call; and sending the reactive notification handle to a first device carried by a first user who is approaching the boundary of the activity during the activity for the first user to show the text message.

10. The computer implemented method of claim 1, the generating comprising:

creating, by a noise control engine of the environment, a proactive notification handle, as one of the one or more noise control handle, the proactive notification handle includes a text message, the text message informing that the activity is in progress and warning not to make any sound louder than the noise tolerance level of the activity, wherein the environment is an office environment, and wherein the activity is a conference call; and sending the proactive notification handle to respective devices corresponding to any user within the boundary of the activity who is not a participant to the activity.

11. A computer program product comprising:

a computer readable storage medium readable by one or more processor and storing instructions for execution by the one or more processor for performing a method for providing a noise control service for one or more activity in an environment, comprising:

obtaining data relevant to an activity of one or more user, from one or more device in the environment;

determining that the activity is presently in progress;

analyzing a context of the activity;

generating one or more noise control handle for the activity based on the context of the activity; and performing one or more operation specified in the one or more noise control handle such that a noise louder than a noise tolerance level associated with the activity would be prevented in a boundary of the activity.

12. The computer program product of claim 11, wherein the one or more device in the environment is selected from an Internet of Things (IoT) device that is portable and carried by a user, an environment device that is another IoT device located in the environment, and combinations thereof, wherein the one or more device within the environment is registered for identification and access, and wherein the one or more user conducting the activity is privileged for the noise control service in the environment.

13. The computer program product of claim 11, the analyzing comprising:

ascertaining respective values applicable for the boundary of the activity, the noise tolerance level of the activity, user privileges for participants of the activity, content of speech in the activity, and respective identities of the participants, by use of the data from the obtaining.

14. The computer program product of claim 11, wherein the one or more noise control handle is selected from a direct control handle, a reactive notification handle, a proactive notification handle, and combinations thereof, wherein the direct control handle commands the one or more device to lower volume to below the noise tolerance level of the activity, wherein the reactive notification handle warns a first user approaching the boundary of the activity not to generate any sound louder than the noise tolerance level of the activity, and wherein the proactive notification handle notifies any user within the boundary of the activity not to generate any sound louder than the noise tolerance level of the activity.

15. The computer program product of claim 11, the generating further comprising:
adjusting the boundary of the activity based on data useful for the noise control service stored in a knowledgebase, wherein the data stored in the knowledgebase include sound pressure levels of common audio sources, various noise tolerance levels corresponding to past activities, and additional factors specific for the activity including a topic being discussed in the activity, confidentiality of the activity, confidentiality of the topic, identities of the participants, and combinations thereof, wherein one or more user scheduling the activity input values for parameters on the context of the activity, and wherein the values are stored in the knowledgebase by machine learning.

16. A system comprising:
a memory;
one or more processor in communication with memory; and
program instructions executable by the one or more processor via the memory to perform a method for providing a noise control service for one or more activity in an environment, comprising:
obtaining data relevant to an activity of one or more user, from one or more device in the environment;
determining that the activity is presently in progress;
analyzing a context of the activity;
generating one or more noise control handle for the activity based on the context of the activity; and
performing one or more operation specified in the one or more noise control handle such that a noise louder than a noise tolerance level associated with the activity would be prevented in a boundary of the activity.

17. The system of claim 16, wherein the one or more device in the environment is selected from an Internet of Things (IoT) device that is portable and carried by a user, an environment device that is another IoT device located in the environment, and combinations thereof, wherein the one or more device within the environment is registered for identification and access, and wherein the one or more user conducting the activity is privileged for the noise control service in the environment.

18. The system of claim 16, the analyzing comprising:
ascertaining respective values applicable for the boundary of the activity, the noise tolerance level of the activity, user privileges for participants of the activity, content of speech in the activity, and respective identities of the participants, by use of the data from the obtaining.

19. The system of claim 16, wherein the one or more noise control handle is selected from a direct control handle, a reactive notification handle, a proactive notification handle, and combinations thereof, wherein the direct control handle commands the one or more device to lower volume to below the noise tolerance level of the activity, wherein the reactive notification handle warns a first user approaching the boundary of the activity not to generate any sound louder than the noise tolerance level of the activity, and wherein the proactive notification handle notifies any user within the boundary of the activity not to generate any sound louder than the noise tolerance level of the activity.

20. The system of claim 16, the generating further comprising:
adjusting the boundary of the activity based on data useful for the noise control service stored in a knowledgebase, wherein the data stored in the knowledgebase include sound pressure levels of common audio sources, various noise tolerance levels corresponding to past activities, and additional factors specific for the activity including a topic being discussed in the activity, confidentiality of the activity, confidentiality of the topic, identities of the participants, and combinations thereof, wherein one or more user scheduling the activity input values for parameters on the context of the activity, and wherein the values are stored in the knowledgebase by machine learning.

21. A computer implemented method for providing a noise control service for one or more activity in an environment, comprising:
capturing, by one or more processor of a device, real time data generated by a user, wherein the user is registered with a noise control service engine of the environment by use of a user profile, and wherein the device is associated with the user in the user profile as being carried by the user;
streaming, by the one or more processor, the real time data from the capturing to the noise control service engine;
receiving, by the one or more processor, one or more noise control handle directed to the device from the noise control service engine in order to prevent any noise louder than a noise tolerance level associated with an activity of the one or more activity within a boundary of the activity for a privileged user; and
performing, by the one or more processor, operations respectively specified in the one or more noise control handle such that the user and the device do not produce any sound louder than the noise tolerance level that disturb the activity of the privileged user.

22. The computer implemented method of claim 21, the performing comprising:
responsive to determining that the one or more noise control handle includes a direct control handle;
reducing, by the one or more processor, the speaker volume of the device as specified in the noise control handle to or below the noise tolerance level such that any noises that disturb the activity of the privileged user is prevented, wherein the activity is presently ongoing, and wherein the device is within the boundary of the activity.

23. The computer implemented method of claim 21, the performing comprising:
responsive to determining that the one or more noise control handle includes a proactive notification handle,
warning, by the one or more processor, the user of the device not to make any noises louder than the noise tolerance level of the activity, by use of visual/tactile notifications, wherein the activity is presently ongoing, and wherein the device is within the boundary of the activity.

24. The computer implemented method of claim 21, the performing comprising:

responsive to determining that the one or more noise control handle includes a reactive notification handle, warning, by the one or more processor, the user of the device not to make any noises louder than the noise tolerance level, by use of visual/tactile notifications, wherein the activity is presently ongoing, and wherein the device is approaching the boundary of the activity.

25. A computer implemented method for providing a noise control service for one or more activity in an environment, comprising:

capturing, by one or more processor of an environment device, any real time data collected from the environment, wherein the environment device is registered with a noise control service engine of the environment;

streaming, by the one or more processor, the real time data from the capturing to the noise control service engine, wherein the real time data is on an activity subject to a noise control service as provided by the noise control service engine in the environment, and wherein the environment device is selected from a security camera, an area microphone system, and combinations thereof;

receiving, by the one or more processor, a direct control handle for the environment device from the noise control service engine, the direct control handle commanding the environment device not to make any sound louder than a noise tolerance level associated with an activity of the one or more activity within a boundary of the activity for a privileged user, wherein the environment device is located within the boundary; and reducing by the one or more processor, the speaker volume of the environment device as specified in the noise control handle below the noise tolerance level associated with the activity of the privileged user.

* * * * *